(No Model.)

L. SCHAFER.
APPARATUS FOR RECRIMPING CROWN SEALS FOR BOTTLES.

No. 602,916.

Patented Apr. 26, 1898.

Witnesses
W. H. Alexander.
W. D. Coles.

Inventor
Louis Schafer
By Attorneys
Fowler & Fowler

UNITED STATES PATENT OFFICE.

LOUIS SCHAFER, OF ST. LOUIS, MISSOURI.

APPARATUS FOR RECRIMPING CROWN-SEALS FOR BOTTLES.

SPECIFICATION forming part of Letters Patent No. 602,916, dated April 26, 1898.

Application filed December 29, 1897. Serial No. 664,165. (No model.)

*To all whom it may concern:*

Be it known that I, LOUIS SCHAFER, a citizen of the United States, residing at the city of St. Louis, in the State of Missouri, have invented a certain new and useful Apparatus for Recrimping Crown-Seals for Bottles, of which the following is such a clear, full, and exact description as will enable anyone skilled in the art to which it appertains to make and use the same, reference being had to the accompanying drawings, forming part of this specification.

The object of my invention is to enable crown-seals for bottles to be used over again after they have been used one or more times. These are now thrown away after being once used, and in refilling bottles a new crown-seal is used each time. Using a new crown-seal each time a bottle is refilled constitutes quite an item of expense.

By my invention I make crown-seals as good as new after they have been used one or more times, and thus enable crown-seals to be used over and over again without detriment in any way, thus effecting a great saving.

In the accompanying drawings I have shown an apparatus made in accordance with my invention.

Figure 1:
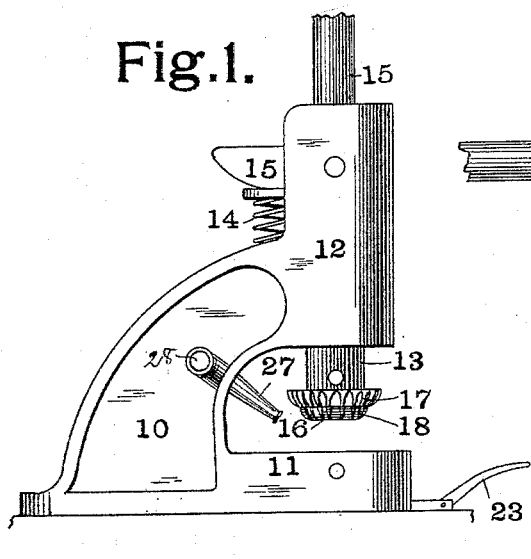
Figure 2:
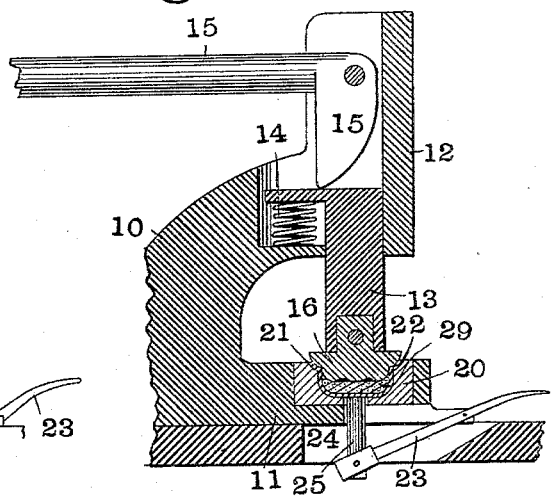
Figure 3:
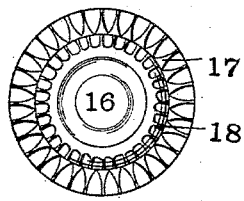
Figure 4:
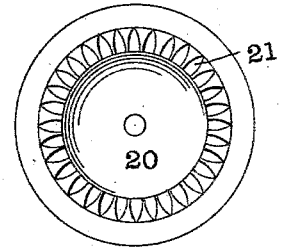
Figure 5:
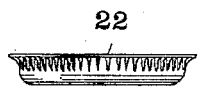
Figure 6:

In said drawings, Figure 1 is an elevation of such apparatus; Fig. 2, a vertical central sectional view thereof. Fig. 3 is a plan view, on an enlarged scale, of the upper or male part of the die for recrimping the crown-seals. Fig. 4 is a plan view of the lower or female part of the die. Fig. 5 is a side elevation of a crown-seal before use, and Fig. 6 a similar view of the same after use.

The same marks of reference indicate the same parts in the different figures of the drawings.

10 is the frame of the apparatus, and 11 the base thereof. At the upper end of the frame is carried a semitubular part which works a plunger 13, which is returned to its normal position by a spring 14. The plunger is operated by a cam-lever 15, pivoted in the semitubular part 12. The plunger and its spring and operating-lever may be arranged and operated in any suitable way without departing from my invention. To the lower end of the plunger is attached the upper or male part 16 of the die. This part of the die has two sets of projections 17 and 18 thereon on circular parts of different diameters. The lower projections 18 are adapted to register with the indentations of a used crown-seal before it has been reflared and recrimped and does this during the first part of the stroke of the plunger, the reflaring and recrimping of crown-seals being completed by the upper projections 17 and the indentations 21 of the lower part of the die.

20 is the lower or female part of the die, and has a series of indentations 21 therein which register with the projections 17 of the upper or male part of the die. The depressed part or hollow of this die is of a size to receive the unflared part of a crown-seal 22 which has been used, Figs. 2 and 6, the crown-seal before used being shown in Fig. 5.

To the lowest part of the frame 10 is pivoted a lever 23, which works in a cut-away place 24 in the support upon which the apparatus rests. This lever 23 carries at its inner end a vertical pin 25, which is pivoted thereto. The upper end of this pin 25 comes against the crown-seal in the die and, when the plunger 13 is in its raised position and the outer end of the lever 23 is depressed, ejects the recrimped crown-seal from the die.

27 is a nozzle projecting from one side of the frame 10 toward the lower or female part of the die. This nozzle is fed by a pipe 28, which conveys hot water or steam to the crown-seal in the die to cleanse the same and soften the cork 29 thereof before the crown-seal is recrimped.

The operation of my apparatus is as follows: The used crown-seals are placed in the female part of the die with the cork part upward, and while in this position a stream of hot water or steam plays upon the same to clean the crown-seal and soften the cork, which has a circular depression therearound due to prior use. The crown-seal being cleansed and purified and the cork more or less softened by this treatment, the male part of the die is forced down onto the crown-seal, the projections and indentations of the two parts of the die recrimping the crown-seal and flaring it ready for reuse, as shown in Fig. 5, and the central part of the die pressing out the circular depression in the cork. Thus a used crown-seal is made as good as new. The lever 23 is now operated to eject the crown-seal from the die.

Having fully set forth an apparatus embodying my invention and the operation of such apparatus, what I desire to claim and secure by Letters Patent of the United States is—

1. An apparatus for recrimping crown-seals for bottles, consisting of a die, one part of said die adapted to receive used crown-seals, and having a series of recrimping indentations, and the other part of said die having two sets of projections on circular parts of different diameters registering with the indentations of the other part of the die, to recrimp the crown-seals substantially as set forth.

2. In an apparatus for recrimping crown-seals, a nozzle for spraying the crown-seals when in the die to cleanse and purify the same and to soften the cork thereof, and a die for recrimping and reflaring the edges of the crown-seals and for pressing out the indentations in the corks thereof.

3. In an apparatus for recrimping crown-seals, a die adapted to receive used crown-seals and having suitable recrimping projections and indentations, a plunger for forcing the parts of the die together to recrimp the crown-seals, a lever for operating said plunger, and a lever and suitable connections for ejecting the crown-seals from the die after they are recrimped.

In testimony whereof I have hereunto set my hand and affixed my seal in the presence of the two subscribing witnesses.

LOUIS SCHAFER. [L. S.]

Witnesses:
J. CLARENCE TAUSSIG,
A. C. FOWLER.